(12) United States Patent
Brown et al.

(10) Patent No.: US 8,020,756 B2
(45) Date of Patent: Sep. 20, 2011

(54) AUTHORIZATION SYSTEM AND METHOD

(75) Inventors: Steven T. Brown, Franklin, WI (US); Jimmie L. Lindsey, Milwaukee, WI (US)

(73) Assignee: Metavante Corporation, Jacksonville, FL (US)

( * ) Notice: Subject to any disclaimer, the term of this patent is extended or adjusted under 35 U.S.C. 154(b) by 1268 days.

(21) Appl. No.: 11/494,958

(22) Filed: Jul. 28, 2006

(65) Prior Publication Data

US 2008/0046747 A1     Feb. 21, 2008

(51) Int. Cl.
    *G07F 19/00*     (2006.01)
(52) U.S. Cl. .................................. 235/379; 235/472.01
(58) Field of Classification Search .............. 235/472.01, 235/472.02, 472.03, 379
    See application file for complete search history.

(56) References Cited

U.S. PATENT DOCUMENTS

| | | | |
|---|---|---|---|
| 5,590,038 A | 12/1996 | Pitroda | |
| 5,884,271 A | 3/1999 | Pitroda | |
| 5,950,173 A | 9/1999 | Perkowski | |
| 6,607,136 B1 | 8/2003 | Atsmon et al. | |
| 6,616,049 B1 | 9/2003 | Barkan et al. | |
| 6,705,520 B1 | 3/2004 | Pitroda | |
| 6,769,607 B1 | 8/2004 | Pitroda et al. | |
| 6,905,072 B2 | 6/2005 | Ramachandran | |
| 6,925,439 B1 | 8/2005 | Pitroda | |
| 7,243,851 B2 * | 7/2007 | Zhu et al. | 235/472.02 |
| 2002/0077974 A1 | 6/2002 | Ortiz | |
| 2003/0075610 A1 | 4/2003 | Ong | |
| 2003/0115126 A1 | 6/2003 | Pitroda | |
| 2003/0120745 A1 | 6/2003 | Katagishi et al. | |
| 2003/0158781 A1 | 8/2003 | Philip | |
| 2005/0004866 A1 | 1/2005 | Bonalle et al. | |
| 2005/0109841 A1 | 5/2005 | Ryan et al. | |
| 2005/0247777 A1 | 11/2005 | Pitroda | |
| 2006/0289654 A1 * | 12/2006 | Robinson et al. | 235/462.46 |
| 2008/0235135 A1 * | 9/2008 | Blinn et al. | 705/41 |

* cited by examiner

*Primary Examiner* — Karl D. Frech
(74) *Attorney, Agent, or Firm* — Greenberg Traurig, LLP (57) ABSTRACT

A system including a device having a screen and a memory to hold card data necessary to complete POS/ATM transactions. The device has an authorization, signature, PIN button and scroll wheel. Branding areas allow distributors to leverage space on the device. When the merchandise has been processed and ready to be paid for, the device holder either places their device in a docking station or holds it in front of a contact less reader. When the merchant is ready for authorization, the holder presses transmits the data to a register so the merchant can send the data through the card network for authorization. Once the transaction is authorized, the merchant requests the signature, fingerprint, and/or photo of the holder, which can be displayed, on the register to authenticate the holder. Upon completion, the transaction information is transmitted back to the device for storage and retrieval at a later date.

12 Claims, 7 Drawing Sheets

AUTHORIZATION SYSTEM AND METHOD

BACKGROUND OF THE INVENTION

1. Field of the Invention

The present invention relates to a payment system, device and method. More specifically, the present invention is a system including a device that connects to a terminal to make a payment. The device has a scroll wheel for finding an account number within a memory and a button to authorize a transaction from that account.

2. Discussion of the Related Art

Various electronic transaction devices exist that store multiple account information. There are also systems and methods involving those devices.

The below-referenced U.S. patents and published U.S. applications disclose embodiments that were at least in-part satisfactory for the purposes for which they were intended. The disclosures of all the below-referenced prior United States patents, and applications, in their entireties are hereby expressly incorporated by reference into the present application for purposes including, but not limited to, indicating the background of the present invention and illustrating the state of the art.

U.S. Pat. Nos. 5,590,038, 5,884,271, 6,925,439, and U.S. Pub. App. No. 2005/0247777 to Pitroda all disclose substantially the same invention. The invention is a universal electronic transaction card ("UET Card") that is pocket-sized, stores a variety of credit cards and records all transactions that can be downloaded to a computer at a later time. These patents also disclose the use of storing a digital image of the user's signature to be used for verification purposes. These patents also disclose a device called a communication interface unit ("CIU") that is needed for the UET Card to communicate with a computer or point of sale ("POS") terminal. The CrU can interface with the UET Card via infrared or RF technologies.

U.S. Pat. No. 6,705,520 (hereinafter the '520 patent) and U.S. Pat. No. 6,769,607 to Pitroda et al. disclose a wireless adapter for POS card readers to be able to interface with various electronic transaction devices such as PDAs, and cell phones.

U.S. Pat. No. 6,905,072 to Ramachandran discloses a portable device that can be a key fob, has an LCD screen, and stores multiple credit card numbers and a digital image of a user's signature. The device further may have a wireless communication component that can send the image of the user's signature to a POS terminal.

U.S. Pub. App. No. 2002/0077974 to Ortiz discloses a hand-held device with an integral card reader and a touch screen display. As part of a transaction, a credit card is swiped through the reader and wirelessly sent to a wireless network. The user then signs the touch screen display on the device that is then wirelessly transmitted to the network to authorize the transaction.

U.S. Pub. App. No. 2003/0075610 to Ong discloses an electronic credit card ("ECC") that can store multiple credit card account information and wirelessly transmit data to a number of receivers, including ATMs and supermarket POS terminals.

U.S. Pub. App. No. 2003/0158781 to Philip discloses an RF-based transponder device that takes the place of single credit card. When using the transponder in a transaction, a user points the transponder at a reader and types in a PIN number located on the transponder. The user still has to sign a traditional printed receipt however and nothing is disclosed about storing multiple credit card accounts.

What is needed therefore, is a device that includes the scroll wheel to select an account, and one or more buttons for user verification and authorization of a transaction. Furthermore, a method of using the device and a system utilizing the device is also needed.

BRIEF SUMMARY OF THE INVENTION

A primary object of the invention is to provide an apparatus that includes the scroll wheel to select an account, and one or more buttons for user verification and authorization of a transaction. Furthermore, a method of using the device and a system utilizing the device is also needed. Another object of the invention is to provide an apparatus that is ruggedized and reliable, thereby decreasing down time and operating costs. Another object of the invention is to provide an apparatus that has one or more of the characteristics discussed above but which is relatively simple to manufacture, assemble, and use with a minimum of equipment and not much training.

One aspect of the invention includes an account access authorization device that has a compact, durable outer housing. This housing preferably allows the device to be handheld and portable and to also take a beating without failing. The device also preferably includes a means for accessing multiple accounts, such as bank accounts, credit or debit card accounts, etc. A scroll wheel is preferably incorporated into the housing. An authorized user may select the desired account with the scroll wheel or select some other option. The user. device may be a portable PC, BlackBerry, cell phone, palm pilot, or ipod-like device.

It then authorizes the user to access the account for, e.g., payment or some other transaction. The device is a means for storing a user's unique information including an account number, account type, and a digital user identification means, e.g., a photo, a fingerprint, or a signature. A means for storing electronic receipts may also be provided. The device preferably also includes an LCD or LED screen for displaying the account information and options available on the device. A first button is preferably also present in the housing for sending the selected account information to a checkout register. This "authentication" button actively transmits authorization when it is pressed by the user. A second button in the housing is for sending the digital user identification means to the register, while a third button is for sending a user's identification means to the register. A means for transmitting data from the inventive device to another device is included and may consist of a direct connection, e.g., connection port, or docking station, or a wireless connection, e.g., an RF or IR signaling mechanism. Another device to which a signal may be sent is an ATM device.

Branding areas within the housing allow distributors to leverage space on the device for branding logos. Additionally, the screen may by provided with branding space or may be used to display other options or, e.g., if a touch screen, selection capabilities.

The connection port means, e.g., a USB port, may also connect the authorization device to a computer or other device for downloading a user's transaction history, uploading coupons, and/or uploading shopping lists.

In another aspect, the authorization device allows authorization of a variety of financial transactions including, e.g., gift card payments, for a purchase at a retail outlet, such as a department store. In this embodiment, the device can be attached to a keychain of a user. The device preferably also has a storing means, e.g., memory within the housing to store for later retrieval of data, a processor to aid in the same, and a button within the housing for at least one of signaling a register that a user authorizes a financial transaction, transmitting the card information to the register, e.g., a POS system, and sending the digital image to the register to be displayed to a cashier. The device may also be used for sending images to the register to be displayed to a cashier to help prevent fraud.

A docking mechanism is within the housing to dock the device to a capture device such as a point of sale terminal or a home computer. The device may also be equipped with an RFI transmitter for sending the card data to another device to complete a purchase.

In another aspect, the device preferably includes a security means that does not broadcast the card data unless initiated by the holder. The means preferably provides the holder of the device with a hacker-resistant memory, and two-factor authentication preferably operably connected to the memory. The two-factor authentication system includes a personal identification number (PIN) chosen by the user and/or a digital photo of the user.

In another aspect, the device may also store in its memory images that include at least one of: driver's identification photographs, fingerprints, passport images, and check images. A means is provided to the user for completing and signing a check image. The device is capable of sending such images to a receiving device that is connected to a display to confirm user identity. The receiving device may be a merchant POS system or a register to receive a payment. Once the transaction is complete, the check number and/or image are incremented to the next check number available to the device. A means is provided to the merchant to download the check image into one of: a personal financial management system and a positive pay system managed by a financial institution.

In another aspect, the invention also includes a method and system of authorizing a transaction. The method and system generally includes a user or device holder selecting an item for purchase at a merchant and then the user "paying" for the item at a checkout register by placing an authorization device in a docking station attached to a register. Alternatively, the user may hold the device in front of a contactless reader operably connected to the register to pay for the item selected. The user authorizes the purchase and payment transaction by pressing a button on the device to transmit data (e.g., credit card account number, user information, etc.) to the register so the merchant can send the data through a card network for authorization. The merchant then requests of the device holder or user a verification means by signature and a photo of the user or device holder. A display then displays the verification means on preferably the register for the merchant to verify or authenticate the holder. The verified merchandise information and other purchase history information (e.g., SKU/UPC level information, date, dollar amount, credit or debit card data, etc.) are transmitted back to the device for storage and retrieval at a later date. Once this is accomplished, the transaction is complete. The purchase and merchandise information may be retrieved by the user or device holder at the user's home, for example, on a PC. This information may be used to, e.g., balance a checking account, create and store a shopping list, or find and access a coupon. For operably connecting with the device, the PC may be equipped with a docking station, a USB or some other port, electronic receiving means, etc. The method may include selecting a check on the device, populating check fields, transmitting the check to the register, displaying the check on the register monitor for viewing, and pressing a button to superimpose the user's signature on the signature line of the check being displayed. Preferably, in this process, the check that is image replacement document certified is stored and then incrementation to the next available check number occurs. The record of the check is then stored on the device's memory. This record may be downloaded later by the device's user into a personal financial management tool, Quicken software, or uploaded into a bank's positive pay system. The record may also be used to clear the check the merchant collected at the point of sale by digitally matching it against the image that was stored in the device.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

In describing the preferred embodiments of the invention, which is illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word connected, attached, or terms similar thereto are often used. They are not limited to, e.g., direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. Resume

The invention preferably is a simple device that can be attached to a keychain or other handheld product and leverages known technology. The device stores and retrieves data necessary to complete financial transactions. The device may resemble an RSA SecurID device and preferably has a small, but easily readable, LCD/LED screen. The device has a memory that holds information necessary to complete, e.g., POS/ATM transactions (e.g., Visa, MasterCard, Discover, AMEX, etc.). The device also preferably stores a digital image of a signature and/or picture of the holder. It may also store a merchandise information-recording transaction (electronic receipt), which can be loaded into financial software (Money, Quicken, etc.). The memory may also store SKU/UPC information for creating shopping lists and assembling coupons. The device may leverage RSA technology to display changing digital PIN.

The device preferably has three buttons that trigger the authorization process. An authorization button signals a checkout register that the user authorizes the transaction. This button may also transmit (via docking station or RFI) credit card or debit data to the register. A signature button transmits a digital image of the holder's signature and/or a photo image to the register. When the signature is requested, this button sends the digital images to the register to be displayed to the cashier (if register is capable). This feature eliminates signature pad terminals, which wear out and do not capture the signature very well. Also, it helps prevent fraud by displaying an image of the user's signature on the register instead of the back of the card.

In one embodiment, the merchant processes holder's purchase as usual. When the merchandise has been processed and is ready to be paid for, the device holder either places their device in a docking station attached to the register or holds it in front of a contact-less reader. When the merchant is ready for authorization, the holder presses the Auth button to transmit the data to the register so the merchant can send the data through the card network for authorization. Once the transaction is authorized, the merchant can ask for the signature and/or picture of the holder, which can be displayed on the register for the merchant to verify the holder. Upon completion of the transaction, the merchandise information can be transmitted back to the device for storage and retrieval at a later date.

2. Detailed Specification for Preferred Embodiments

Figure 1:
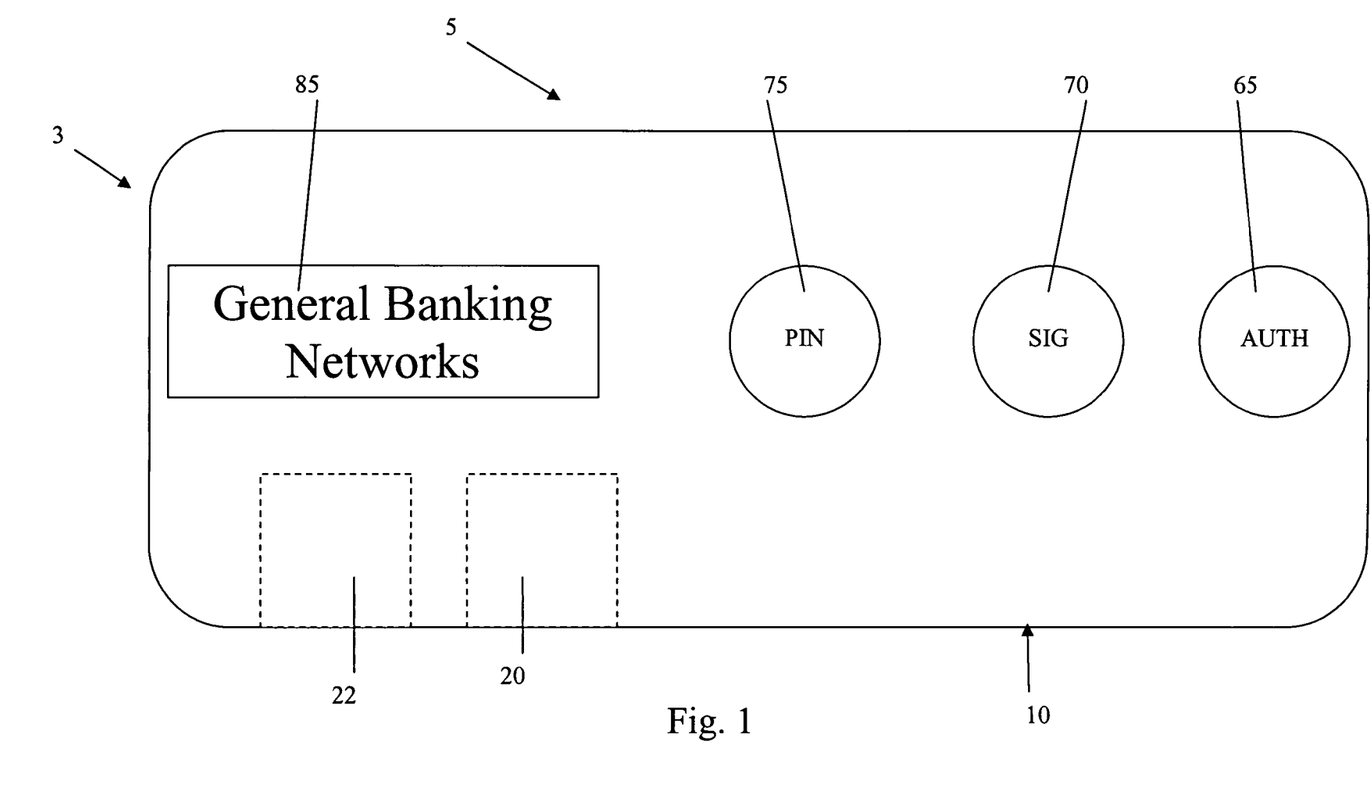
FIG. 1 illustrates a top view of a device of one embodiment of the present invention.

FIGS. 1-7 show system 3 including a device 5 that consists of an impact-resistant housing 10. As best shown in FIG. 1, the device 5 is about 2-3 inches long, 1-2 inches wide, and 1 inch thick. In one preferred embodiment, the device 5 is the size of a standard handheld key fob device such as a SecureID device made by RSA.

Figure 2:
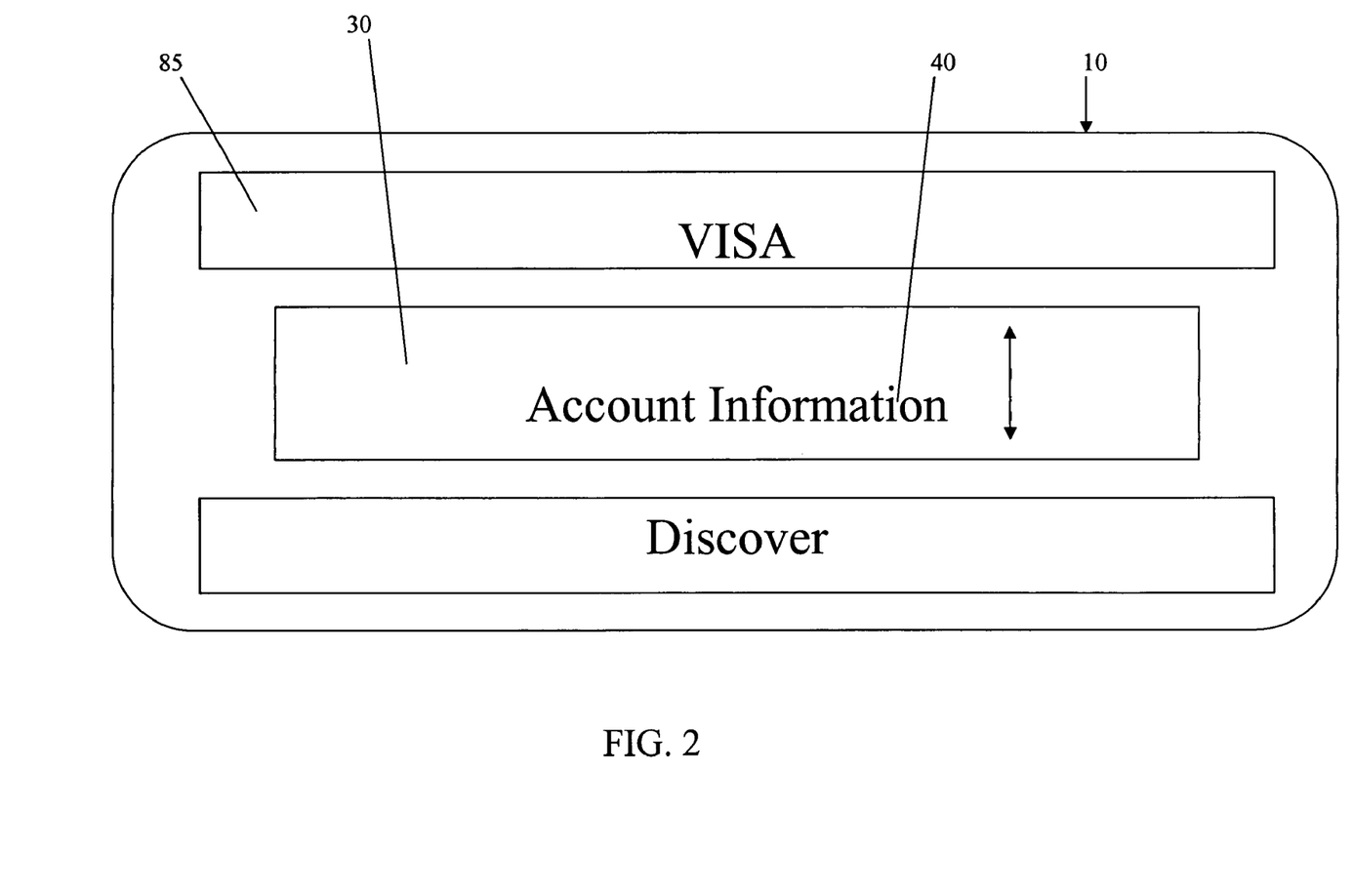
FIG. 2 illustrates a bottom view of the embodiment of the present invention shown in FIG. 1.

Encased within the housing 10 is preferably a memory 20 and processor 22. A screen 30 is preferably surrounded by the housing 10, as shown. As best shown in FIG. 2, the screen 30 is preferably a liquid crystal display (LCD). However, the screen may also be a light emitting diode (LED) or a similar type of screen. The screen must be small enough to fit within the handheld device but large enough to be easily readable by a user. For example, the user must be able to see account information 40 on the screen 30. The account information 40 preferably includes a credit card or debit card account number, the expiration date, the financial institution that issued the account such as M&I Bank, and also the transaction authorizing agency such as VISA, American Express, or MasterCard.

In one preferred embodiment, the device 5 has several input/output (I/O) means connected thereto. For example, in one preferred embodiment, e.g., FIG. 3, the I/O means may include a mouse or scroll wheel 60 that allows a user to scroll through a multitude of account information and also preferably select the desired account. A user could, for example, select a credit card account that is issued by M&I Bank under the MasterCard family of brands. Once that account information is accessed and selected, the user is ready to authorize a transaction from that account. One benefit of such a device 5 is that the user can electronically easily access many different accounts to authorize payment for merchandise selected at a retailer. This provides the user with a substitute for carrying numerous credit or debit cards in the user's wallet or billfold.

In another embodiment of the invention, such as that shown in FIG. 1, the I/O means also include one or more buttons that allow the user to authorize payment for the merchandise and also complete the transaction. For example, an authorization button 65 may be present on the housing I/O. The authorization button 65 allows a user to press it and authorize the beginning of a transaction payment.

Figure 6:
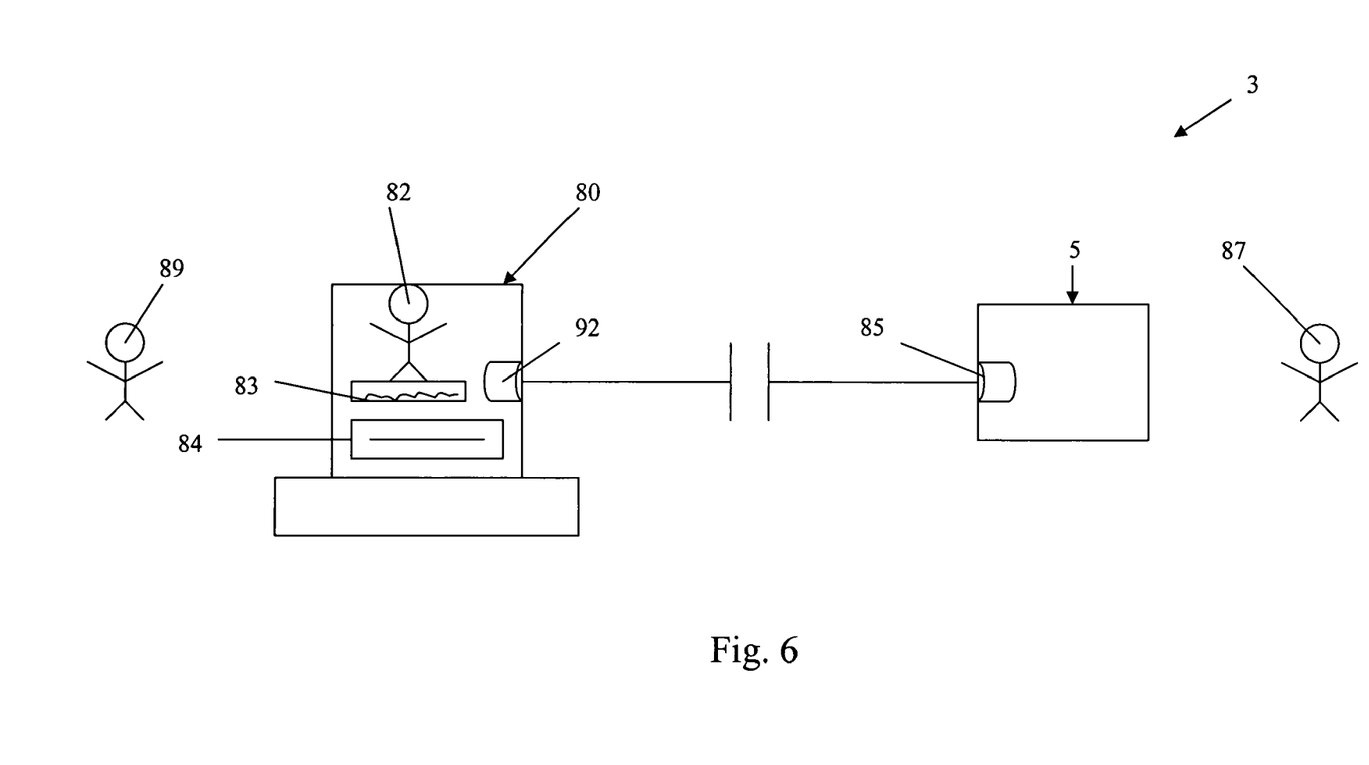
FIG. 6 shows an embodiment of a system of the present invention.

A signature button 70 may also be present on the housing 10. The signature button 70 provides electronic verification by a user 87 of ownership of the accounts and ability to consent to make a payment. As shown in FIG. 6, the signature button, when pressed, may, for example, transmit an image 82 such as a photo or a signature 83 to a cash register or POS terminal 80. Once the signature or other verification means, a photo, fingerprint, etc. of the user is transmitted to the terminal 80, it may be displayed on a screen connected to the terminal so that a merchant 89 may verify the user's authority to complete the transaction. This feature will aid merchants and users in combating credit card fraud.

As best shown in FIG. 1, a third button 75 may also be present. This button preferably allows the user to input a personal identification number (PIN) or other code into the device 5. This provides a second authentication means in a two-way authentication system, with the signature means preferably being the first. As added security, the device 5 is preferably hacker resistant and comes pre-loaded with the account and signature verification information and means. Branding areas 88 may also be present on the device 5 so that financial institutions and other organizations can advertise their brand as shown in FIGS. 1 and 2.

Specific embodiments of the present inventive system will now be further described by the following, non-limiting examples which will serve to illustrate various features of significance. The examples are intended merely to facilitate an understanding of ways in which the present invention may be practiced and to further enable those of skill in the art to practice the present invention. Accordingly, the examples should not be construed as limiting the scope of the present invention.

Figure 3:
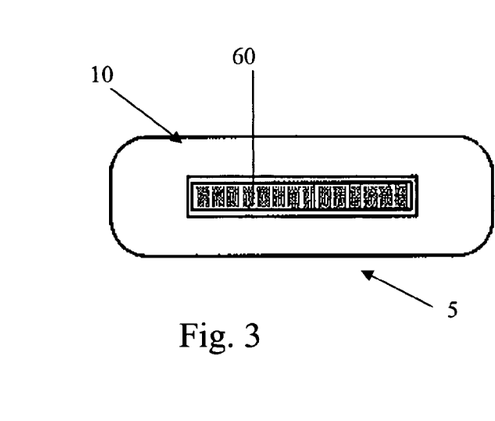
FIG. 3 shows a right side view of the device shown in FIG. 1.
Figure 4:
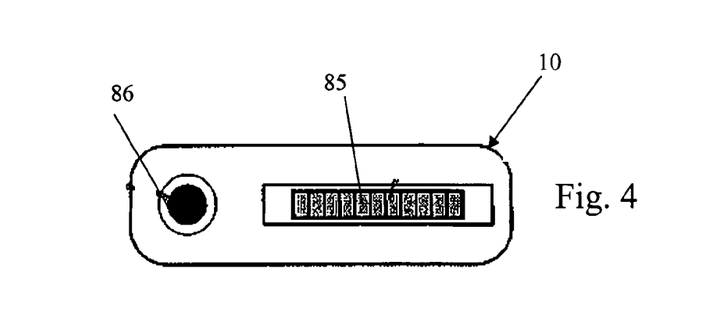
FIG. 4 shows a left side view of the device shown in FIG. 1.
Figure 5:
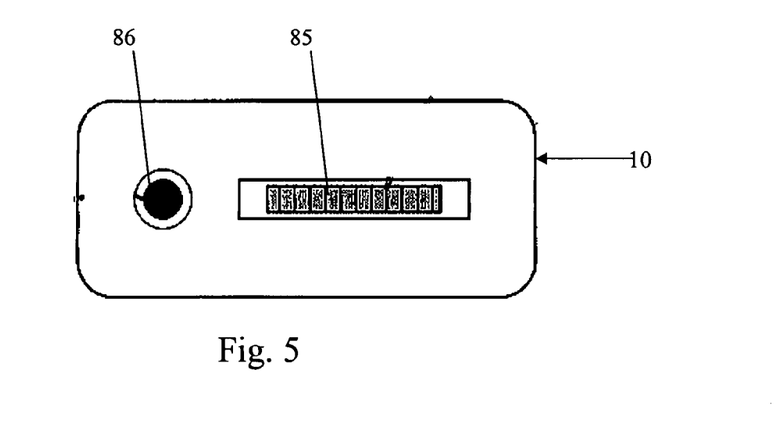
FIG. 5 shows an embodiment of a device with docking station.

In one embodiment, as shown in FIG. 6, a check image 84 is also transmitted to the terminal 80. That image looks preferably like a regular paper check as is known in the art. As best shown in FIG. 3, a transmitter or transmitting means 85 is also preferably operably connected to the device 5. The transmission means 85 may be a docking port 86 or some other transmission means such as a laser light beam like those found on a TV remote control or an RFI transmitter. Terminal 80 may also have a receiver 92 to receive the information transmitted by the transmitting means 85 as shown in FIG. 6. In one embodiment, the device docks to the terminal by, e.g., a cable or USB connector.

Figure 7:
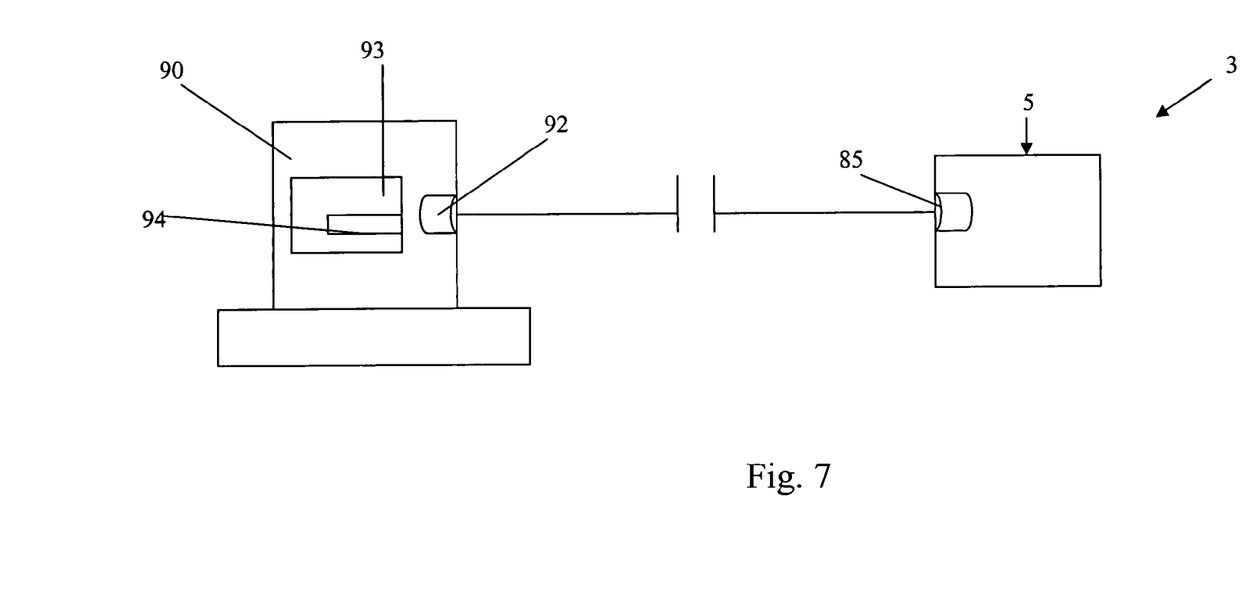
FIG. 7 shows an embodiment of a system of the present invention.

As shown in FIG. 7, the user may have a terminal and/or a computer at home that can also dock to the device 5. The home terminal or computer may be, for example, a PC, Mac, BlackBerry, or a similar device. The terminal 90 also preferably has a receiver 92. The receiver receives the information transmitted from the device 5 to help the user keep track of its accounts and transaction data. The terminal is preferably a screen 93, which can display account information and other information such as grocery list and coupon data 94 which can be created by the user on the home terminal 90 from the transaction information collected from the device 5. Again, a docking port or USB connector may be present on the device and the terminal.

Figure 8:
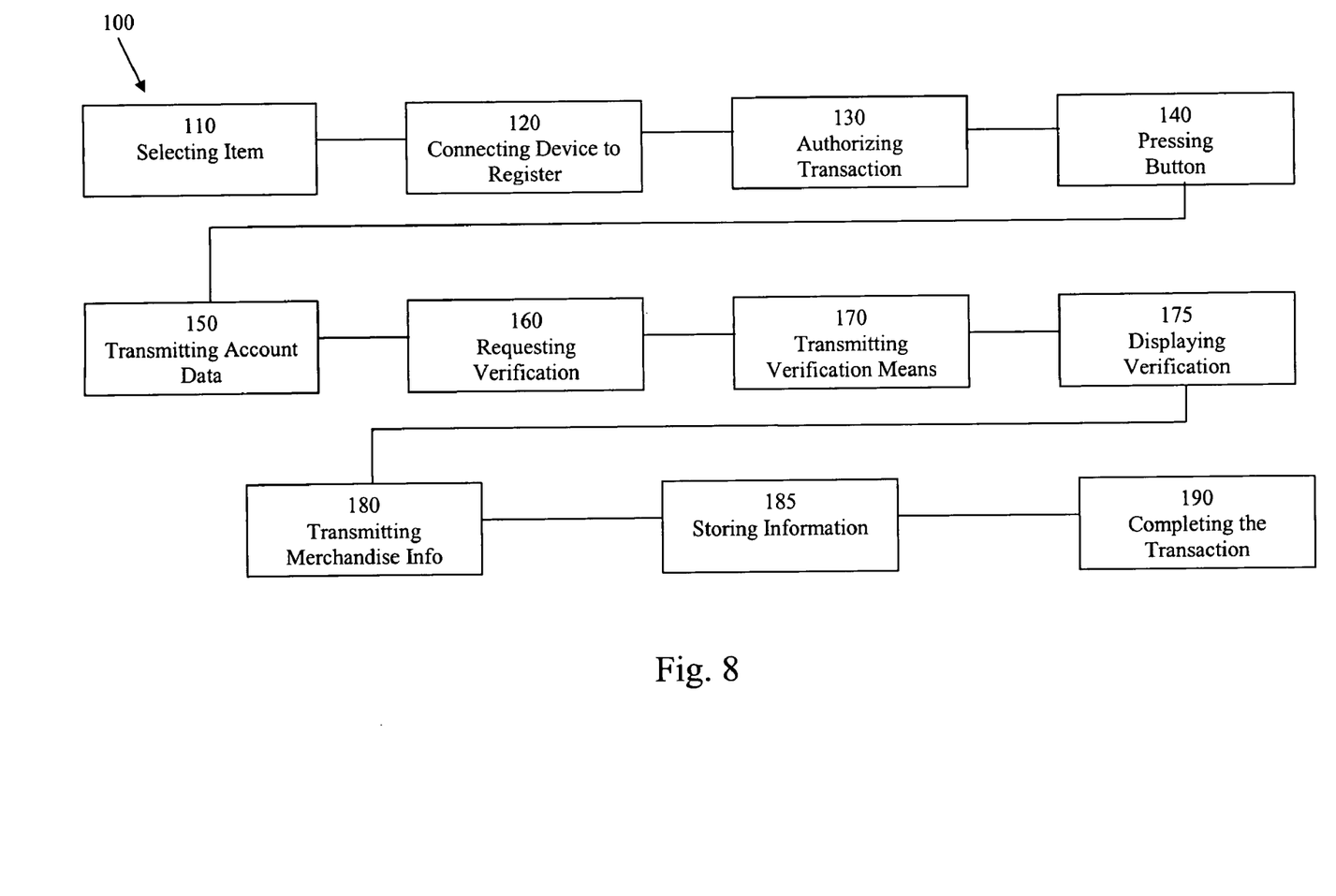
FIG. 8 shows a flow chart of a method of the present invention.

FIG. 8 shows one embodiment of the method of the present invention 100. In this embodiment, the inventive method 100 begins with step 110 of the device user selecting an item for purchase. The user next approaches the checkout register and connects the device 5 to the register terminal in step 120. Once connected, the user completes an authorization step 130 to authorize a transaction to take place from a certain credit card or other account, which the user has selected. Preferably, the user presses a button in the next step 140 to transmit account data to the terminal (step 150). The merchant then requests user verification in the next step (160). The user then transmits a verification means, for example, signature, a photo, a fingerprint, etc. in step 170. Preferably, in the next step 175, the verification means is displayed to the merchant or the merchant's representative at the register to confirm and verify that the user is entitled to use the device 5 and access the account. The merchandise is then checked out and merchandise information is transmitted back to the device (step 180). The device 5 stores the information in memory (step 185). The transaction is then complete (step 190).

Figure 9:
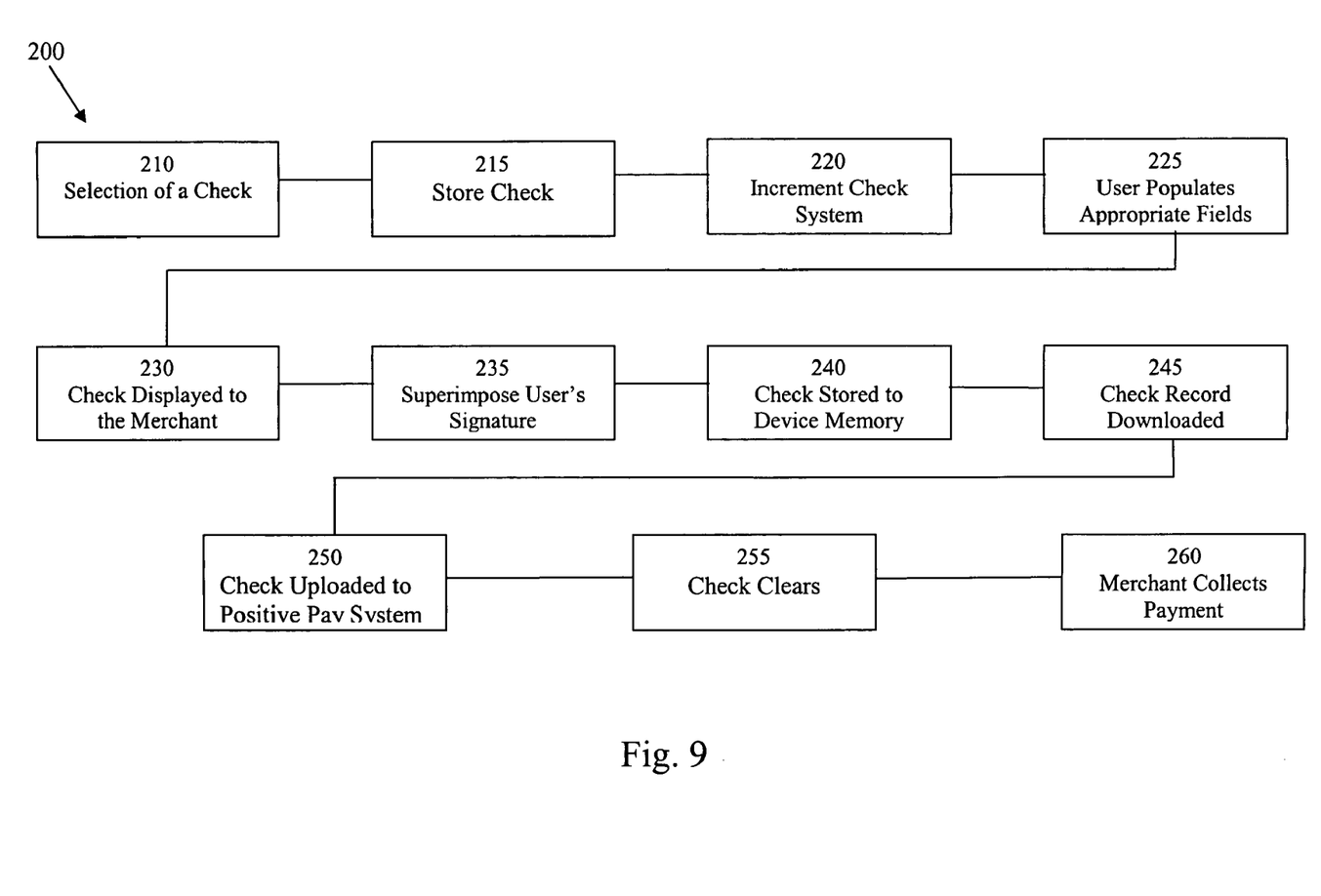
FIG. 9 shows a flow chart of a method of the present invention.

In another embodiment shown in FIG. 9, the method of the present invention (200) includes the user's selection of a check on the device (210). The check is stored in an image replacement document certified manner such as those authorized by the check 21 rules (step 215). Next, the check system is incremented to the next available check number (step 220). The user then populates the appropriate fields in the selected check image including the amount owed, etc. (step 225). The check image or record is then displayed on a register monitor or POS for viewing by the merchant (step 230). To complete the transaction, the user presses a button to superimpose the user's signature on the signature line of the check being displayed (step 235).

In one preferred embodiment, the check is then stored as a record on the memory within the device (step 240). The check record can then later be downloaded by the user to a personal financial management tool (step 245). The check record can also be uploaded into a bank's positive pay system from the merchant (step 250). Finally, the check clears (255) the bank's system and the merchant is allowed to collect on the payment (step 260). This feature allows for the use of checks without the need to handle write or scan paper checks.

Further, the above-described process may be no different than the current use of checks at a point of sale, however, there is not a paper check. A company can load the check numbers and dollar amounts into a positive pay system and when the bank receives them for clearing, they can match against the list the business sent. Note, this method may be run through a system like that of the Endpoint Exchange Network system offered by CheckClear LLC of Oklahoma.

When transaction information and other data is downloaded by the user, the transaction data and other information may be downloaded into a Money or Quicken type of system. This information may assist the user in tracking purchases, making grocery lists, and gathering coupons for follow-up trips to the retailer.

The positive pay system mentioned above is preferably managed by a financial institution, e.g., ARC at point of sale, with the device acting as the image capture device.

There are virtually innumerable uses for the present invention, all of which need not be detailed here. All the disclosed embodiments can be practiced without undue experimentation. Further, although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. In addition, the individual components need not be fabricated from the disclosed materials, but could be fabricated from virtually any suitable materials. Moreover, the individual components need not be formed in the disclosed shapes, or assembled in the disclosed configuration, but could be provided in virtually any shape, and assembled in virtually any configuration. Additionally, although many components are described herein as physically separate modules, it will be manifest that each may be integrated into the apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

We hereby claim:

1. A device that allows a device holder to participate in a purchase process, the device comprising:
   a memory on the device that stores account data and captures purchase history information including at least one of SKUs and UPCs;
   a transmitter on the device for sending the account data to a Point of Sale device to complete a purchase;
   an authorization button that prevents the device from transmitting the account data to the Point of Sale device unless initiated by the device holder; and
   an authentication system that provides verification of ownership of at least one account associated with the account data.

2. The device of claim 1, and further comprising a housing capable of attaching to a key chain, the housing including an LCD screen.

3. The device of claim 2, and further comprising the authorization button to authorize the purchase and transmit the account data to the Point of Sale device; a signature button to send digital images to the other device for confirmation of the device holder's identity; and a scroll wheel that allows the holder to scroll through options on the LCD screen.

4. The device of claim 3, wherein the digital images include at least one of identification photographs and passport images.

5. The device of claim 1, wherein the memory additionally stores at least one of digital images unique to the holder, shopping lists, coupons, and check images.

6. The device of claim 1, wherein the authentication system is a two-factor authentication system that includes at least one of a PIN and a digital image unique to the device holder.

7. The device of claim 1, and further comprising one of a portable PC, a BlackBerry, a cell phone, a palm pilot, and an iPod.

8. The device of claim 1, wherein the account data includes an image of a check and the device increments a check number when the transmitter sends the check to the other device.

9. The device of claim 8 and further comprising a button to superimpose a digital signature of the device holder on the check image.

10. The device of claim 8 and further comprising a port to connect the device to a computer for at least one of downloading a transaction history, uploading coupons, uploading shopping lists, and downloading check images.

11. A method of authorizing a transaction, the method comprising the steps of selecting an item for purchase at a merchant;

initiating a transaction for purchase of the item at a checkout register by one of placing an authorization device in a docking station connected to the checkout register and holding the authorization device in front of a contactless reader connected to the checkout register;

authorizing the transaction by pressing an authorization button on the authorization device to transmit data to the checkout register;

upon request of at least one of a signature and a photo of a device holder, pressing a signature button on the authorization device to display at least one of the signature and the photo on the register for authentication;

receiving merchandise information on the authorization device for storage and retrieval at a later date; and completing the transaction.

12. The method of claim 11, and further comprising selecting a check on the authorization device; storing the check in a device memory for replacement document certification; populating check fields on the check; pressing a button to superimpose a signature on the check; transmitting the check to the merchant; and incrementing to a next available check number.

* * * * *

UNITED STATES PATENT AND TRADEMARK OFFICE
CERTIFICATE OF CORRECTION

| | | |
|---|---|---|
| PATENT NO. | : 8,020,756 B2 | |
| APPLICATION NO. | : 11/494958 | |
| DATED | : September 20, 2011 | |
| INVENTOR(S) | : Steven T. Brown et al. | |

It is certified that error appears in the above-identified patent and that said Letters Patent is hereby corrected as shown below:

Title Page, Item (57) Abstract, line 7-8, "contact less" should read --contactless--.

Claim 7, col. 8, line 66, "palm pilot" should read --PalmPilot--.

Claim 11, col. 9, lines 18-19, "contact-less" should read --contactless--.

Signed and Sealed this
Ninth Day of April, 2013

Teresa Stanek Rea
*Acting Director of the United States Patent and Trademark Office*